US007780324B2

(12) United States Patent
Lin

(10) Patent No.: US 7,780,324 B2
(45) Date of Patent: Aug. 24, 2010

(54) WATER-COOLED VEHICLE LED HEAT DISSIPATING DEVICE

(76) Inventor: Chun-Hen Lin, Building B016, No. 1, Weiwang St., Shulin City, Taipei County 238 (TW)

( * ) Notice: Subject to any disclaimer, the term of this patent is extended or adjusted under 35 U.S.C. 154(b) by 0 days.

(21) Appl. No.: 11/637,874

(22) Filed: Dec. 13, 2006

(65) Prior Publication Data

US 2008/0142199 A1 Jun. 19, 2008

(51) Int. Cl.
*B60Q 1/00* (2006.01)

(52) U.S. Cl. ....................... 362/547; 362/264; 362/294; 362/373

(58) Field of Classification Search ................. 362/101, 362/264, 294, 373, 545, 547, 555, 612, 800
See application file for complete search history.

(56) References Cited

U.S. PATENT DOCUMENTS 7,318,660 B2 * 1/2008 Yu ............................ 362/294
2007/0091632 A1 * 4/2007 Glovatsky et al. ........... 362/547

* cited by examiner

*Primary Examiner*—Stephen F Husar
(74) *Attorney, Agent, or Firm*—Muncy, Geissler, Olds & Lowe, PLLC

(57) ABSTRACT

The present invention provides a water-cooled vehicle LED (Light Emitting Device) heat dissipating device, structured from a light emitting device and a heat dissipating device, wherein the light emitting device includes light emitting members and a base plate, and the heat dissipating device includes a water pump device, a water storage device, a water guide member and a heat dissipating body. The heat dissipating body is disposed at one side of the light emitting device, and includes a front plate, a middle plate and a rear plate. Grooves are hollowed out of the front plate, the middle plate and the rear plate, which form a channel, a water inlet and a water outlet when assembled. The water pump device is used to pump water from the water storage device through the water guide member and the channel, thereby achieving objective of effectively dissipating heat.

3 Claims, 6 Drawing Sheets

WATER-COOLED VEHICLE LED HEAT DISSIPATING DEVICE

BACKGROUND OF THE INVENTION (a) Field of the Invention

The art of the present invention provides a water-cooled vehicle LED (Light Emitting Device) heat dissipating device, in which one side of a light emitting device has disposed a heat dissipating body that includes a front plate, a middle plate and a rear plate. Moreover, grooves are hollowed out of the front plate, the middle plate and the rear plate, which when assembled form a channel, a water inlet and a water outlet, and a water pump device is used to pump water from a water storage device through a water guide member and pour into the channel of the heat dissipating body.

(b) Description of the Prior Art

Referring to FIG. 1, which shows general vehicle light emitting devices A, which are easily damaged due to excessive power when there are no heat dissipating devices installed, and if natural convection is used as a heat dissipating method, then it easily leads to imperfect heat dissipation, whereas use of a fan easily produces noise and anxiety over operational life.

Hence, the inventor of the present invention proposes to resolve and surmount existent technical difficulties to eliminate the aforementioned shortcomings of prior art.

SUMMARY OF THE INVENTION

The art of the present invention provides a water-cooled vehicle LED (Light Emitting Device) heat dissipating device, in which one side of a light emitting device has disposed a heat dissipating body that comprises a front plate, a middle plate and a rear plate. Moreover, grooves are hollowed out of the front plate, the middle plate and the rear plate, which when assembled form a channel, a water inlet and a water outlet, and a water pump device is used to pump water from a water storage device through a water guide member and pour into the channel of the heat dissipating body, thereby achieving the objective of effectively dissipating heat.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
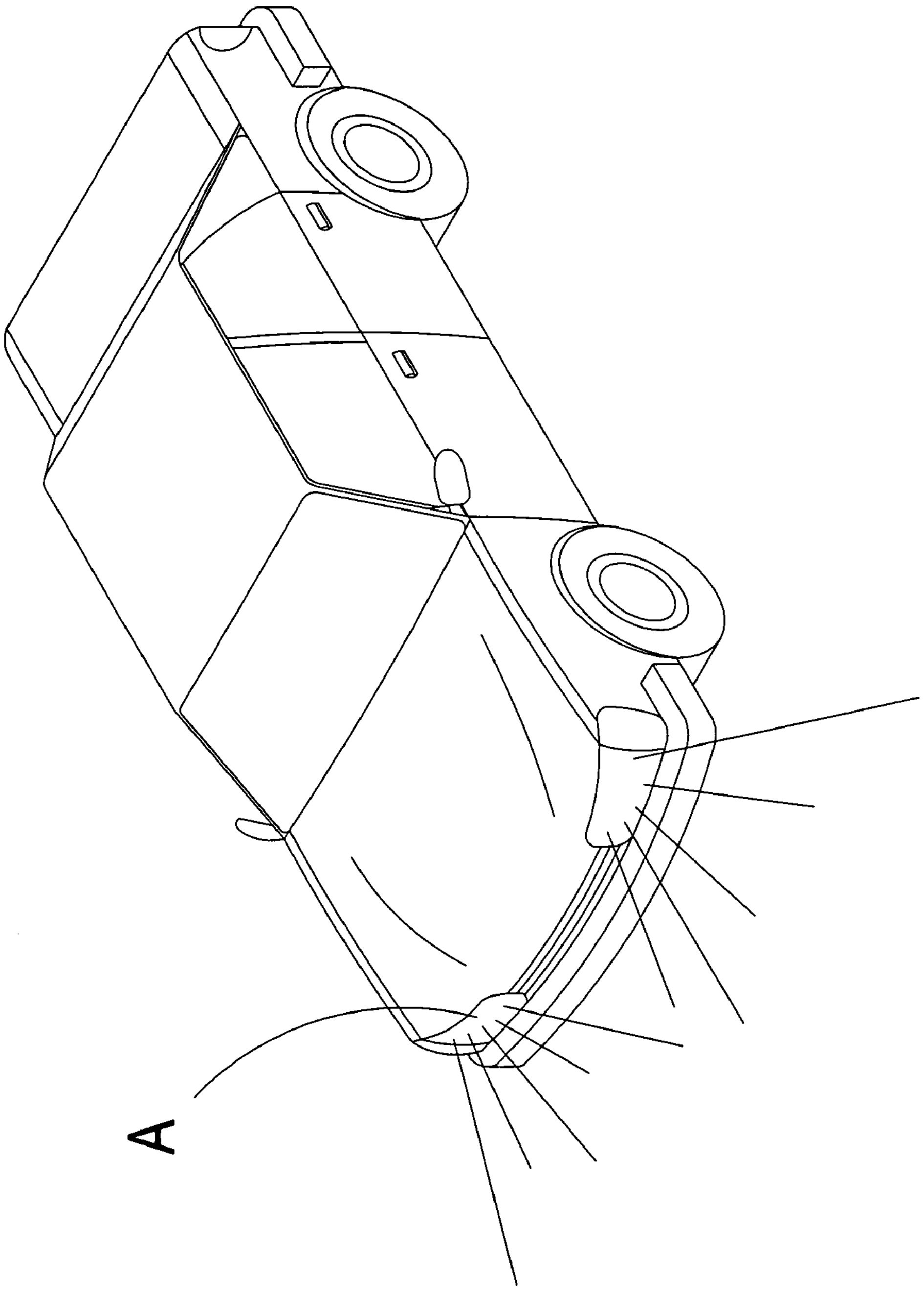
FIG. 1 Prior Art
FIG. 1 shows an elevational view of prior art.
Figure 2:
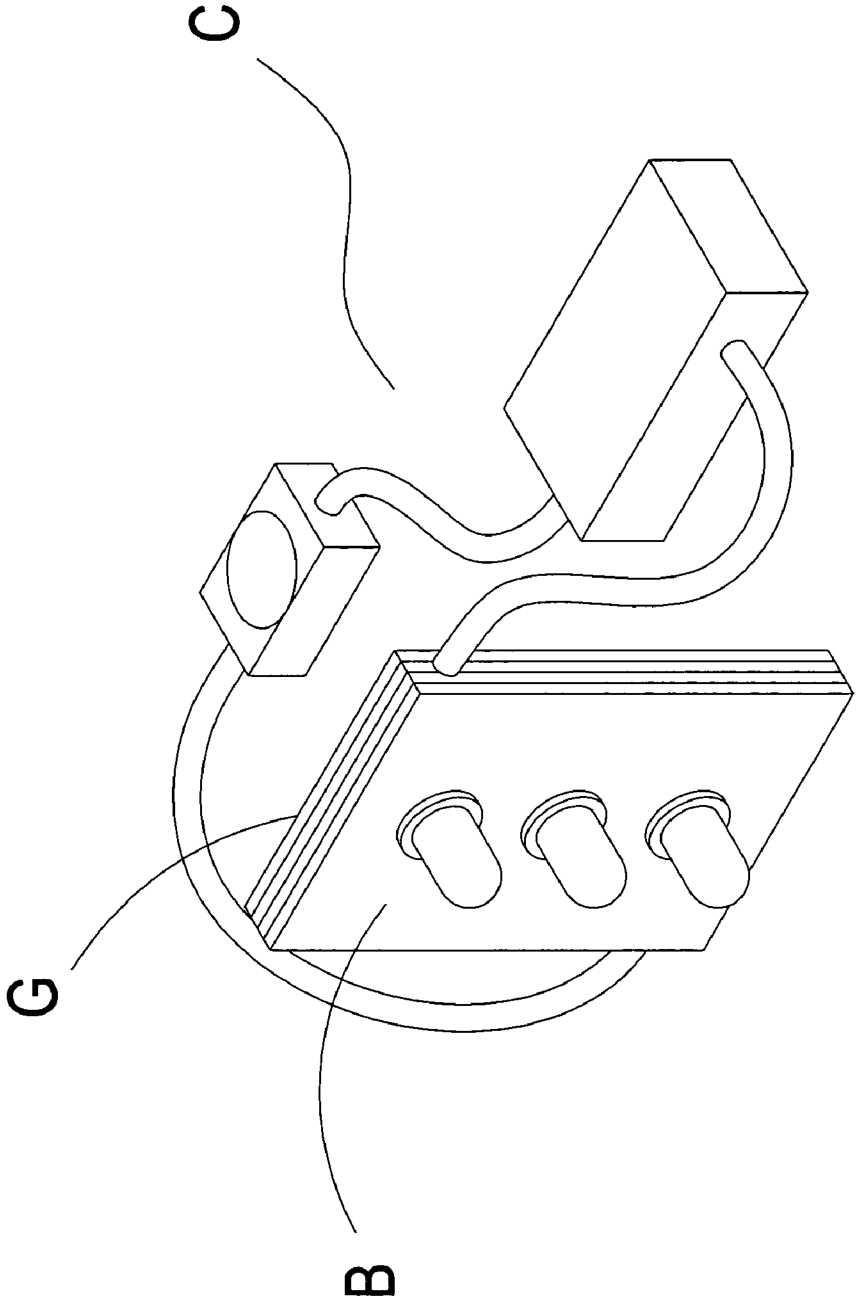
FIG. 2 shows an elevational view according to the present invention.
Figure 3:
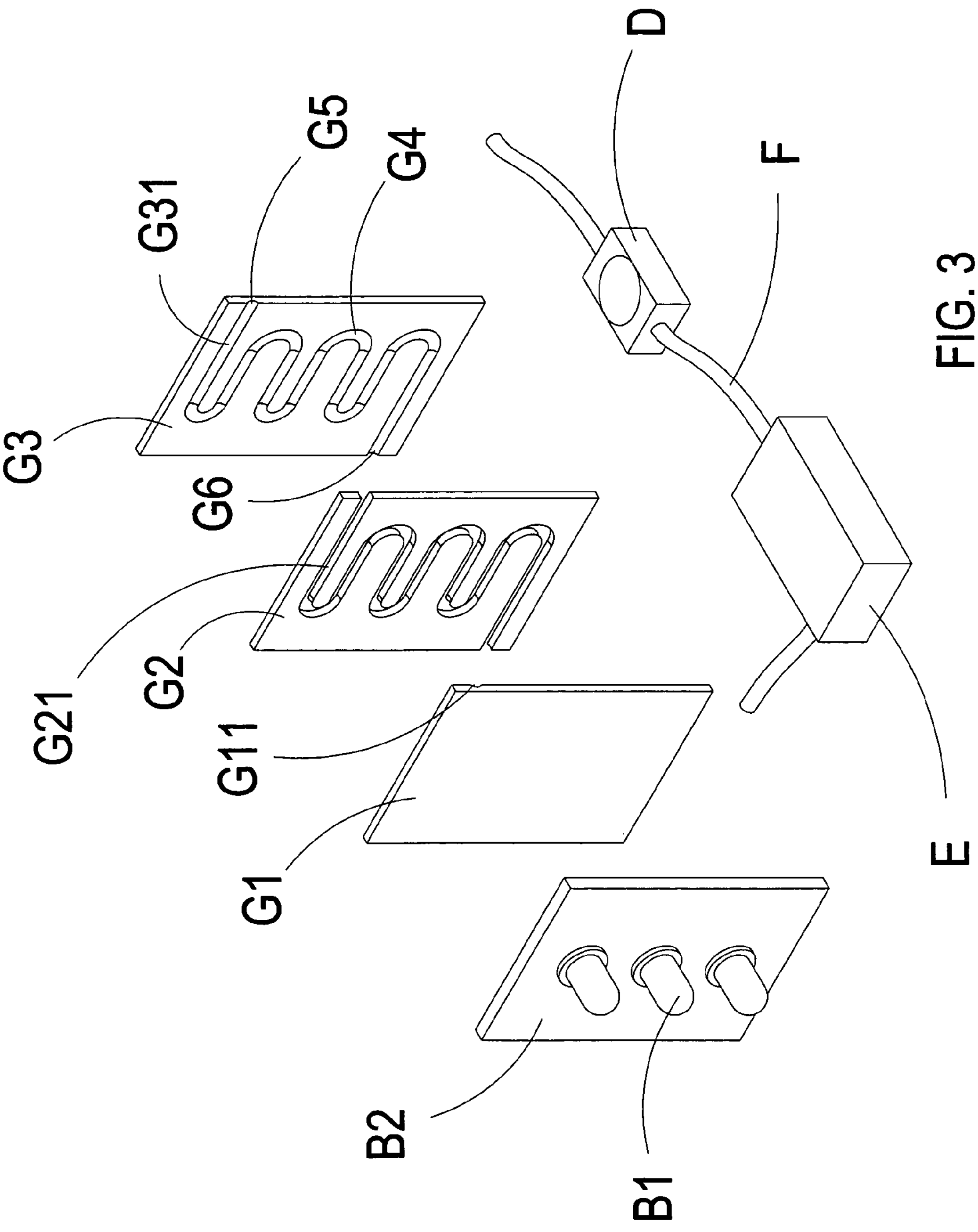
FIG. 3 shows an exploded elevational view according to the present invention.

Referring to FIG. 2 and FIG. 3, which show a water-cooled vehicle LED (Light Emitting Device) heat dissipating device of the present invention structured to comprise a light emitting device B and a heat dissipating device C.

The light emitting device B comprises light emitting members B1 and a base plate B2, and the heat dissipating device C comprises a water pump device D, a water storage device E, a water guide member F and a heat dissipating body G.

The heat dissipating body G is disposed at one side of the light emitting device B, wherein the heat dissipating body G comprises a front plate G1, a middle plate G2 and a rear plate G3.

Grooves G11, G21 and G31 are hollowed out of the front plate G1, the middle plate G2 and the rear plate G3 respectively, and the grooves G11, G21 and G31 form a channel G4, a water inlet G5 and a water outlet G6 when assembled. The water pump device D is used to pump water from the water storage device E through the water guide member F and the channel G4, thereby achieving objective of effectively dissipating heat.

Figure 4:
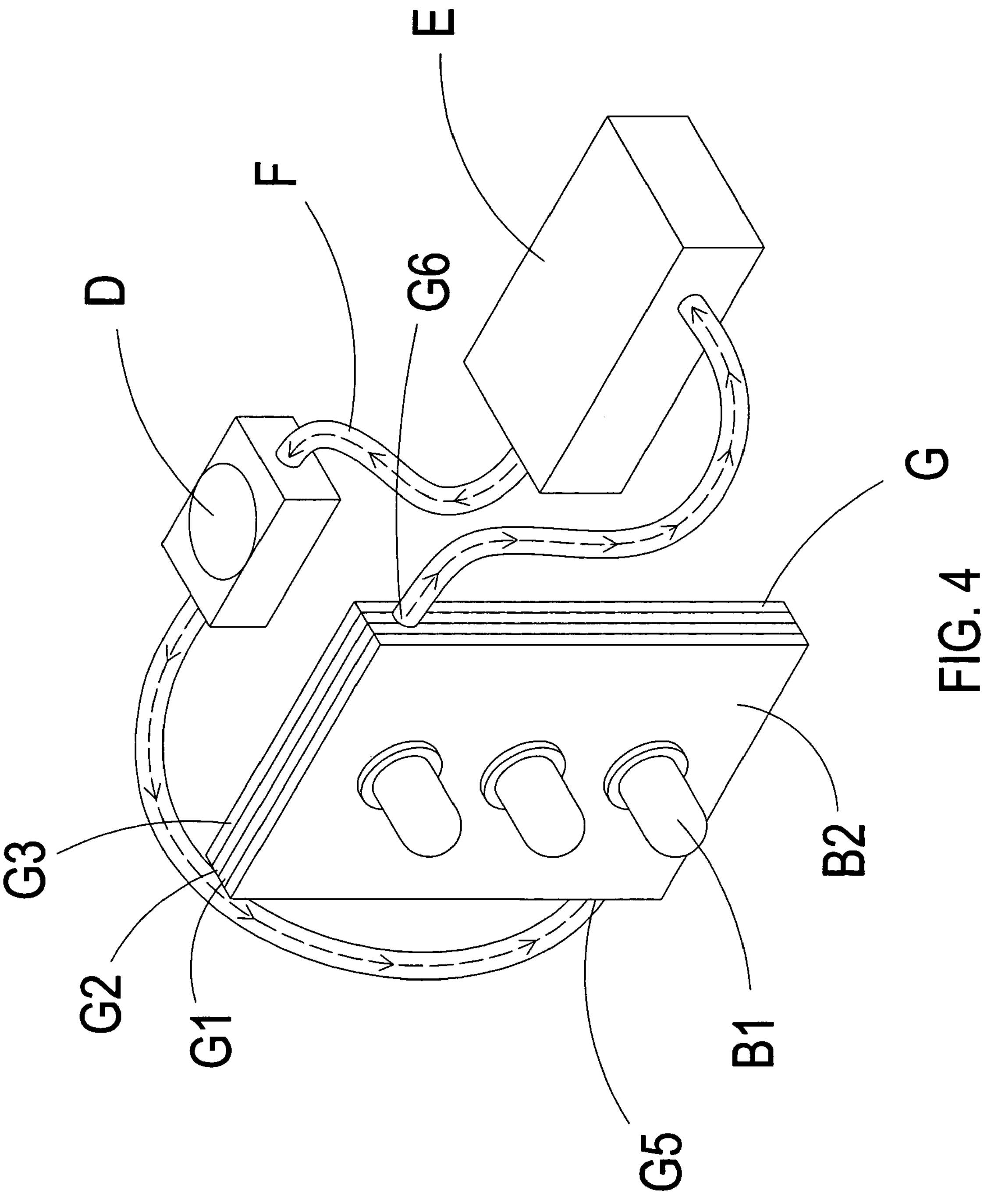
FIG. 4 shows an elevational schematic view of an embodiment according to the present invention.

Referring to FIG. 3 and FIG. 4, which shows an embodiment of the water-cooled vehicle LED heat dissipating device of the present invention, wherein the light emitting members B1 are packaged within preset embedding spaces of the base plate B2. The base plate B2 and the heat dissipating body G are fixedly integrated by rigid rod means. The light emitting members B1 are configured as light-emitting diodes (LEDs), xenon bulbs (HID (high intensity discharge) bulbs) and related light emitting members, and the base plate B2 is fabricated from copper material, aluminum material, alloy material, ceramic material and related material having high heat conduction, high radiation effectiveness.

The heat dissipating body G is structured to comprise the front plate G1, the middle plate G2 and the rear plate G3, and the grooves G11, G21 and G31 are hollowed out of the front plate G1, the middle plate G2 and the rear plate G3 respectively. Moreover, the grooves G11, G21 and G31 form the channel G4, the water inlet G5 and the water outlet G6 when assembled.

The water guide member F joins position of the water inlet G5 to that of the water outlet G6, and the water guide member F further serially connects the pump device D and the water storage device E to form a series connection path, thereby, when the water pump device D is activated and working, water from the water storage device E is pumped through the series connected path to form a circulating flow.

The heat dissipating body G absorbs heat energy produced by the light emitting members B1, and the water flowing into the water inlet G5 and into the channel G4 of the heat dissipating body G implements cooling, whereafter the warmed water is discharged from the water outlet G6 to the water storage device E, whereupon the circulating cycle of carrying away the heat energy absorbed by the heat dissipating body G restarts, thereby enabling achieving the objective of effectively dissipating heat from the light emitting members B1.

Figure 5:
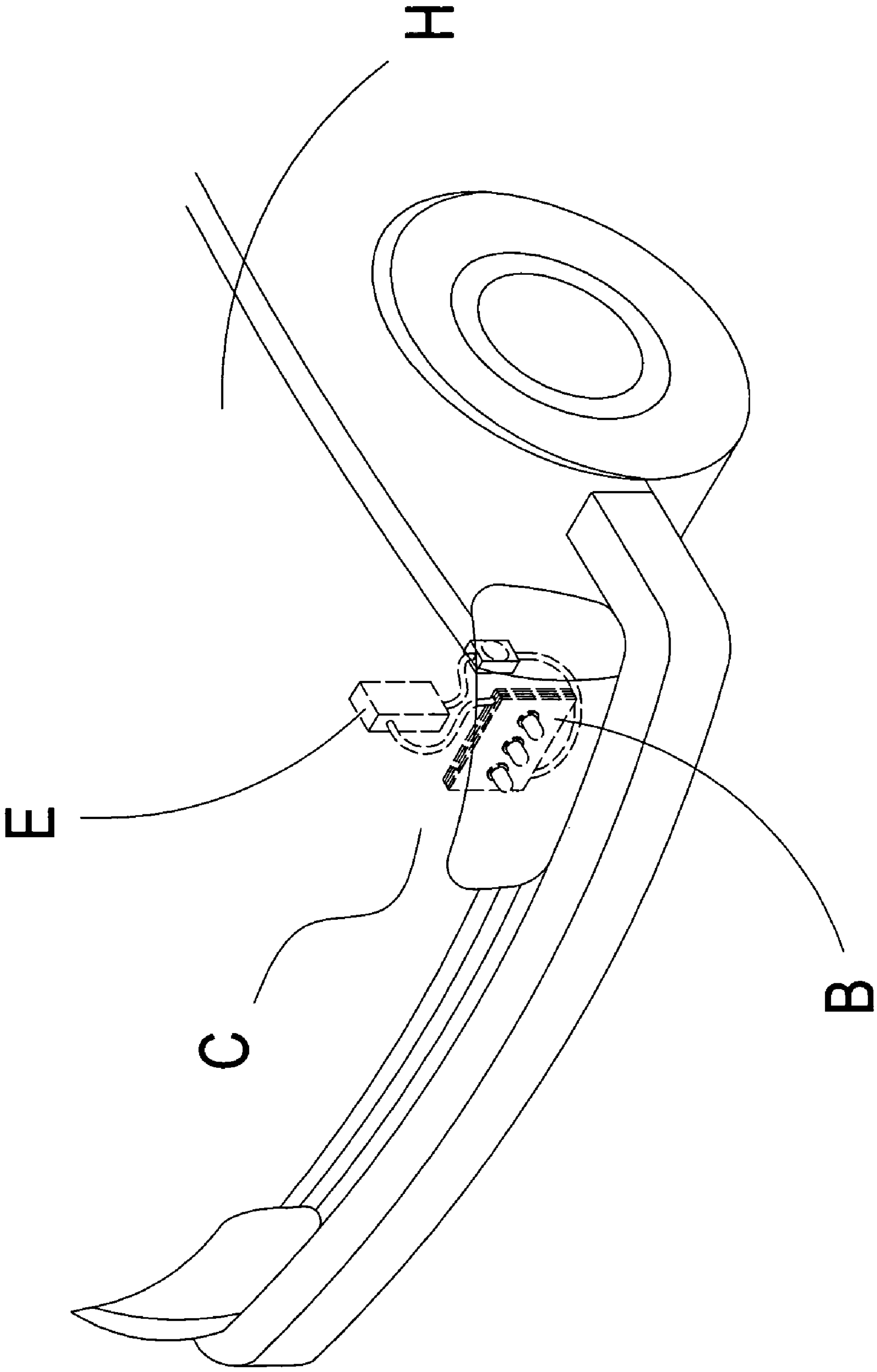
FIG. 5 shows an elevational schematic view of a further embodiment of the present invention in use.
Figure 6:
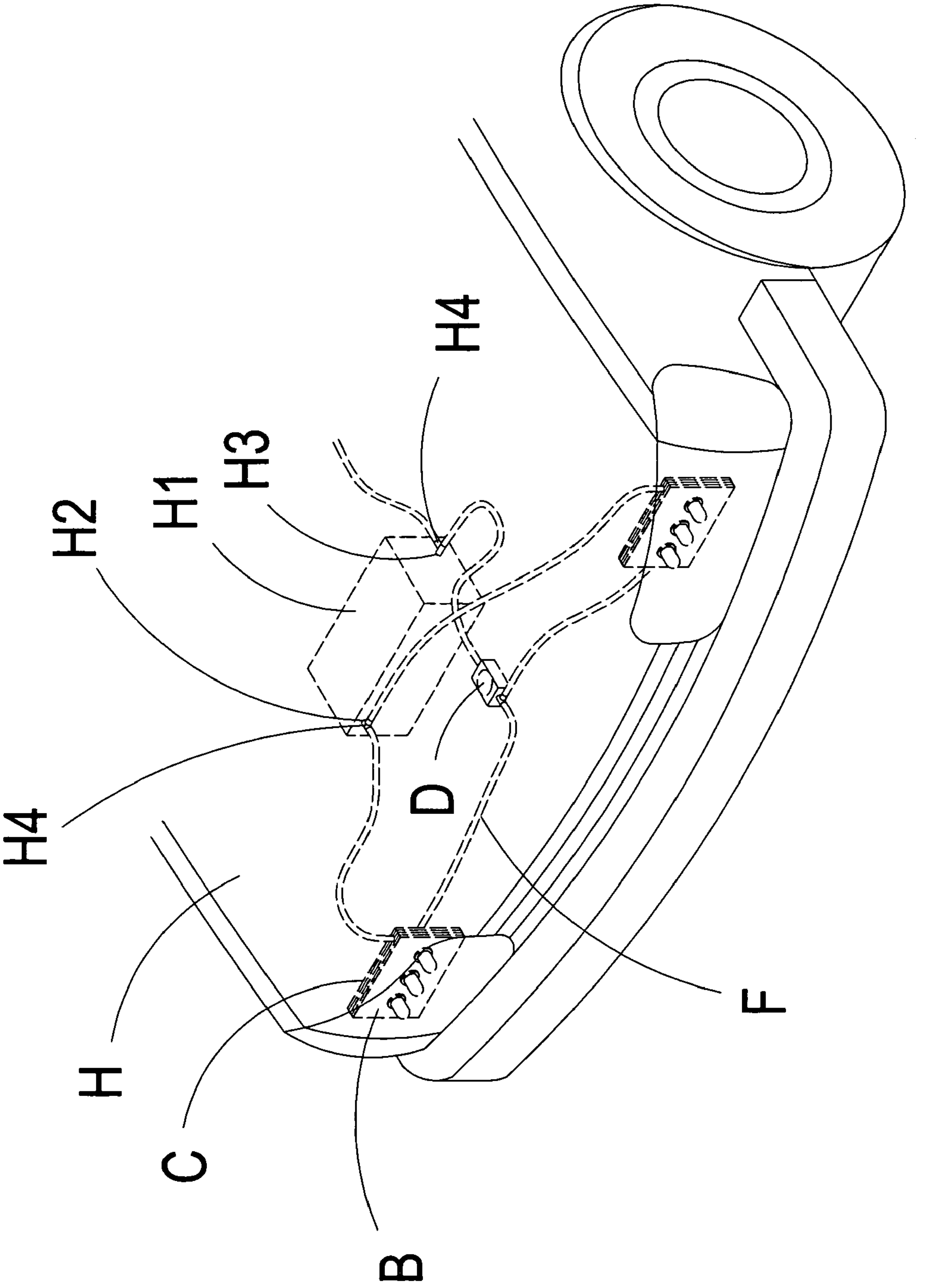
FIG. 6 shows an elevational schematic view of a further embodiment of the present invention in use.

Referring to FIG. 5 and FIG. 6, which show application of the light emitting device B and the heat dissipating device C to headlights of a load-supporting installation H, wherein the heat dissipating device C may use a water storage device H1 of the load-supporting installation H, and tap joints H4 are configured at positions of a water inlet H2 and a water outlet H3 of the water storage device H1. The tap joints H4 are joined to the water guide member F and additionally connected to the water pump device D, thereby enabling achieving effectiveness of water-cooled heat dissipation of the headlights. Accordingly, when the water pump device D is activated and running, the water from the water storage device H1 is made to pass through the serially connected path to form a circulating flow, thereby achieving objective of effective heat dissipation.

In order to better explicitly disclose advancement and practicability of the present invention, a comparison with prior art is described hereinafter:

Shortcomings of Prior Art

1. Vehicle use light emitting devices have no heat dissipating bodies installed.

2. Shortcoming 1 results in the problem of damage to the light emitting devices due to excessive power.

3. Shortcoming 2 results in anxiety over safety when using prior art.

Advantages of the Present Invention

1. The heat dissipating body G is disposed at one side of the light emitting device B.

2. The light emitting device B can be used with a headlight structure of a load-supporting installation.

3. Does not easily result in damage to the light emitting device due to excessive power.

4. Increases safety of use.

5. Provided with advancement and practicability.

6. Enhances industrial competitiveness.

In conclusion, the present invention in overcoming structural shortcomings of prior art has assuredly achieved effectiveness of anticipated advancement, and, moreover, is easily understood by persons unfamiliar with related art. Furthermore, contents of the present invention have not been publicly disclosed prior to this application, and practicability and advancement of the present invention clearly comply with essential elements as required for a new patent application. Accordingly, a new patent application is proposed herein.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A water-cooled vehicle LED (Light Emitting Device) heat dissipating device, comprising a light emitting device and a heat dissipating device, the light emitting device comprises light emitting members and a base plate, and the heat dissipating device comprises a water pump device, a water storage device, a water guide member and a heat dissipating body, wherein the heat dissipating body is disposed at one side of the light emitting device, the heat dissipating body comprises a front plate, a middle plate and a rear plate, and grooves are hollowed out of the front plate, the middle plate and the rear plate, which form a channel, a water inlet and an water outlet when the front plate, the middle plate, and the rear plate are assembled so that the middle plate is sandwiched between the front plate and the rear plate; the water pump device is used to pump water from the water storage device through the water guide member and the channel, thereby achieving objective of effectively dissipating heat, wherein the light emitting device and the heat dissipating device are used with a headlight structure of a load-supporting installation, and the water storage device of the heat dissipating device uses a water storage device of the load-supporting installation.

2. The water-cooled vehicle LED heat dissipating device according to claim 1, wherein the light emitting members are light-emitting diodes (LEDs), halogen bulbs, xenon bulbs (HID (high intensity discharge) bulbs) and related light emitting members.

3. The water-cooled vehicle LED heat dissipating device according to claim 1, wherein the base plate is copper material, aluminum material, alloy material, ceramic material and related material having high heat conduction and high dissipation effectiveness.

* * * * *